Sept. 30, 1969   J. J. C. VANDERSTEEN   3,469,895

BEARING SLEEVE FOR A HYDRODYNAMIC BEARING

Filed Nov. 17, 1967

INVENTOR.
JACOBUS J.C.VANDERSTEEN

BY

AGENT

United States Patent Office 3,469,895
Patented Sept. 30, 1969

3,469,895
BEARING SLEEVE FOR A HYDRODYNAMIC BEARING
Jacobus Johannes Cornelius Vandersteen, Emmasingel, Eindhoven, Netherlands, assignor, by mesne assignments, to U.S. Philips Corporation, New York, N.Y., a corporation of Delaware
Filed Nov. 17, 1967, Ser. No. 683,967
Claims priority, application Netherlands, Dec. 7, 1966, 6617169
Int. Cl. F16c 7/04, 35/00, 19/12
U.S. Cl. 308—9      2 Claims

ABSTRACT OF THE DISCLOSURE

A bearing sleeve having a conical race therein for a spiral groove hydrodynamic bearing. A plurality of grooves are included in the surface of the race for generating fluid pressure between the race and a shaft stub rotatable in the race. The grooves are equally spaced with respect to the center line of the sleeve and are uniformly distributed over the race surface. The cross-section of each groove is trapezoidally shaped.

---

Figure 1:
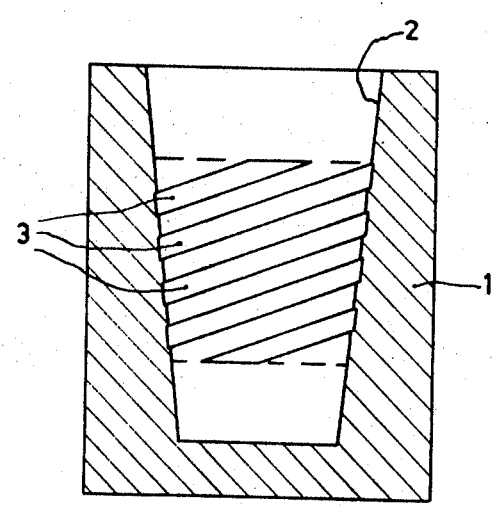

The invention relates to a bearing sleeve for a hydrodynamic bearing having a bearing race constituted by the wall of a conical recess in the sleeve and provided with at least three grooves which are equally spaced with respect to the center line and are regularly distributed over the bearing surface.

Such a bearing sleeve in combination with a conical stub shaft, defines a conical spiral groove bearing. As is known in such a bearing, a significant increase in pressure is produced in the lubricant by relative rotation between the bearing and race, which results in high bearing capacity and low frictional losses.

The incorporation of the shallow grooves into the race or the stub shaft in heretofore known conical spiral groove bearings, was a complicated and expensive operation since the grooves were of rectangular cross-sections.

According to the invention, a spiral groove bearing is provided in which the grooves in the bearing have a cross-sectional area in the form of a trapezoid. The base of the trapezoid coincides with the wall of the conical recess and the base angle remote from the cone tip has a value which is no greater than half the apex angle of the cone.

Figure 2:
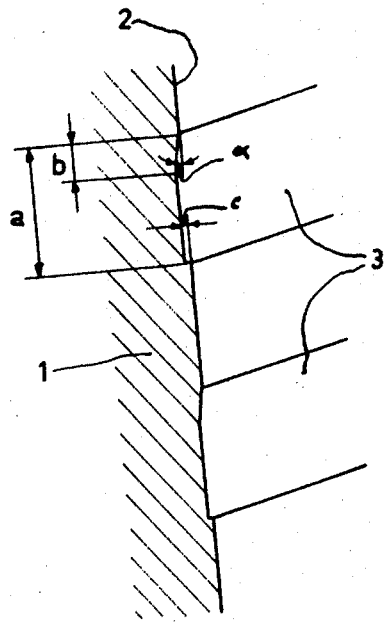

The invention will be described more fully with reference to the drawing, in which:

FIG. 1 is a sectional view of a conical bearing sleeve according to the invention, and FIG. 2 shows on an enlarged scale the shape of the grooves.

A bearing sleeve 1 is provided with a conical recess 2. The race portions in the bearing sleeve is defined by the wall of the recess 2. A plurality of grooves 3 are provided in the bearing race for generating fluid pressure. These grooves are uniformly distributed over the surface of the bearing race. The grooves are relatively shallow, at the most, the depth is 50 microns. Due to the use of the shallow grooves, a conical stub shaft rotating in the bearing sleeve produces a significant increase in the pressure in the lubricant interposed between the race and the stub shaft. Such a bearing, referred to as spiral groove bearing, has a very high bearing capacity and a low coefficient of friction. The cross-sectional shape of the grooves of these bearings was hitherto substantially rectangular.

FIG. 2 shows on an enlarged scale the shape of a groove in a bearing sleeve according to the invention. The grooves have a trapezoidal cross-section. The base of the trapezoid is divided by the bearing surface. The angle $\alpha$, the angle defined by the intersection by a line closing the open side and the side farthest from the cone tip, has a value which is no greater than half the apex angle of the cone. The value of the base angle, the angle defined by the intersection of a line closing the open side and the side nearest the cone tip, is not critical; this angle is normally chosen to be approximately 90°.

The groove shown in FIG. 2 provides the same bearing capacity for the bearing as a groove of rectangular cross-section. One of the most desirable features of the groove shape is the ease of manufacture. The bearing sleeve may now be mass-produced, for example, in a mold. A very suitable molding material is sintered bronze. The shape of the groove provides a self-releasing feature, since the die around which the race is molded can be removed by a direct axial withdrawal. Also, when the conical bearing sleeves according to the invention are fabricated by an injection-molding process, the molding material can be a synthetic resin. Hence, the bearing of the present invention provides an economical article to mass-production.

Investigations have shown that a very effective operating bearing is obtained if the groove dimensions $a$, $b$ and $c$ indicated in FIG. 2 have a ratio of 100:20:2 respectively. Other ratios, which may depend upon the value of the apex angle of the cone, will provide a satisfactory operation of the bearing, however.

Grease or oil are preferred lubricants for the bearing. In principle, however, other lubricants such as water, air, etc. are also suitable.

The above cited embodiments are intended as exemplary only, and while I have described my invention with a specific application and embodiment thereof, other modifications will be apparent to those skilled in the art.

What is claimed is:

1. A bearing sleeve for a hydrodynamic bearing comprising a bearing race defined by the wall of a conical recess in said bearing sleeve, and a plurality of trapezoidal shaped grooves in said bearing race, wherein the angle defined by a line closing the groove and the side of the groove remote from the apex of the conical tip of said conical recess is no greater than half the angle of said conical tip.

2. A bearing sleeve for a hydrodynamic bearing as claimed in claim 1 wherein the depth of said trapezoidal grooves is no more than fifty microns.

References Cited

UNITED STATES PATENTS

| | | | |
|---|---|---|---|
| 3,207,563 | 9/1965 | Muyderman | 308—172 |
| 3,154,353 | 10/1964 | Haringx | 308—9 |
| 3,265,452 | 8/1966 | Pan et al. | |
| 2,986,096 | 5/1961 | Booth et al. | 308—98 |
| 1,377,866 | 5/1921 | White | 308—240 |
| 161,955 | 4/1875 | Hammond | 308—98 |

MARTIN P. SCHWADRON, Primary Examiner

FRANK SUSKO, Assistant Examiner

U.S. Cl. X.R.

308—172